May 9, 1939.   H. POTTER   2,157,098
BEARING
Filed Aug. 24, 1936
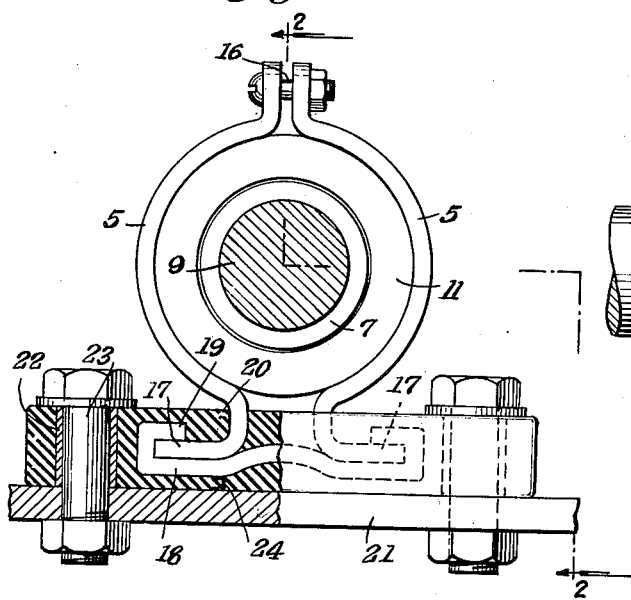
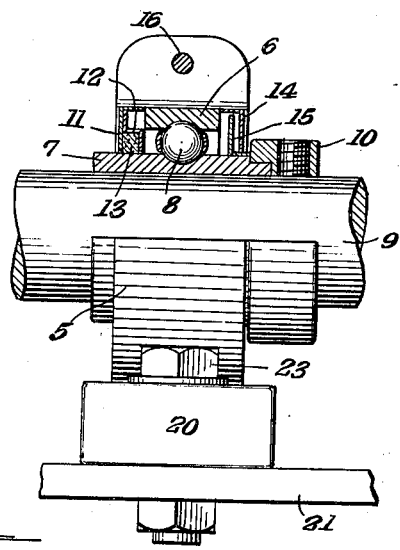
INVENTOR
HOWELL POTTER
BY
ATTORNEYS

UNITED STATES PATENT OFFICE 2,157,098

BEARING

Howell Potter, New Britain, Conn., assignor to The Fafnir Bearing Company, New Britain, Conn., a corporation of Connecticut Application August 24, 1936, Serial No. 97,527

2 Claims. (Cl. 308—184)

My invention relates to a bearing and more particularly to a bearing housing and sound deadening support for the same.

It is an object of my invention to provide a cheap, improved form of bearing mounting and means for deadening bearing noises of the bearing carried thereby.

Other objects and various features of invention will be hereinafter pointed out or will become apparent to those skilled in the art.

In the drawing which shows, for illustrative purposes only, a preferred form of my invention—

Fig. 1 is an axial view of a bearing and mounting, a part being broken away to illustrate features of the invention;

Fig. 2 is a part sectional view taken substantially in the plane of the line 2—2 of Fig. 1.

My improved bearing arrangement includes a housing for a bearing which in the form shown comprises a pair of duplicate metallic strap members 5—5 each arcuately formed and facing each other so as to provide a substantially circular housing for a bearing. The bearing may include an outer bearing ring 6, an inner ring 7, with interposed anti-friction bearing members, such as balls 8. The bearing in the preferred form is of the unit handling type, that is, the balls serve to hold two rings in relation to each other. In the form illustrated, the inner ring 7 is substantially longer than the outer ring so as to provide an effective bearing on the shaft 9 and the ring is held on the shaft as by means of an eccentric locking collar 10 of well known type. I preferably provide seal means at both sides of the bearing and in the form shown there is a washer or seal plate 11 abutting the outside of a generally angularly formed plate 12 which, if desired, may house a felt sealing ring 13, rubbing on or positioned adjacent to the outer ring. The seal as disclosed substantially closes the space between the bearing rings. If desired, an all metallic seal of slightly different form may be employed at the opposite side of the bearing. Such a seal may include a generally cup-shaped seal plate 14, fitting within the bore of the outer ring and a reversely formed plate 15 fitting the outside surface of the inner ring 7 and acting as a slinger. The seal plate 15 preferably fits friction-tight on the inner ring and is held definitely against accidental displacement by the locking collar 10. As illustrated, the seal plates 14 and 12 abut opposite side edges of the outer ring 6 and when the bearing parts and seal means are in place, an adjusting bolt 16 is employed for drawing the ears at the tops of the straps 5—5 together for rigidly but adjustably clamping all of the bearing parts and seals in place. With a strap housing as illustrated, bearings of different size may be readily accommodated.

The bottoms of the straps 5—5 in the preferred form extend downwardly and outwardly so as to form feet 17. The feet are preferably connected by a second strap piece 18 which is crimped over at the ends at 19 so as to quite securely hold the foot portions of the straps 5—5. The entire base of the housing, consisting of the foot portions 17 and the connecting strap 18, is embedded in a block of sound deadening material, preferably a flat rubber block 20. The rubber is cast integrally about the foot portions so that the housing is integrally carried with the rubber base 20. The latter is designed to be supported on any support, as the machine frame part 21. The rubber block 20 is provided with bolt holes carrying spacer bushings 22 of slightly less length than the thickness of the block 20. Bolts 23 pass through the bushings and when the nuts are taken up the block 20 and parts carried thereby are securely held to the support, the rubber being compressed slightly as permitted by the bushings 22, but the compression is so limited by the bushings that the resiliency and sound deadening properties of the rubber are not seriously affected and the rubber will remain resilient and sound deadening for a long period.

It is desirable to ground the bearing in order to prevent the accumulation of undesirable static charges on the bearing or rotating parts. The ground connection may be variously formed, but a wire 24 of, say, 14 gauge secured to or engaging a part of the base strap 18, passing through the rubber block and engaging the support 21, as indicated will serve to properly ground the shaft and bearing when secured as illustrated on a metallic support 21.

It will be seen that I have provided a cheap form of housing for an anti-friction bearing and one which readily lends itself to integral connection with a rubber or other sound deadening base so that the bearing noises will be deadened and not transmitted to the base 21. The housing and base are of course handled as a unit.

While the invention has been described in considerable detail and a preferred form illustrated, it is to be understood that various changes may be made within the scope of the invention as defined in the appended claims.

I claim:

1. In a device of the character indicated, opposed strap members each arcuately formed so as to provide a substantially circular housing, an anti-friction bearing comprising inner and outer bearing rings with interposed anti-friction bearing members, said outer ring being embraced within said arcuately formed portions of said straps, means for adjustably connecting said straps for securing said bearing between said straps, a securing base member connecting the bottoms of said straps, the bottoms of said straps and securing base member being permanently embedded in a block of rubber formed integrally thereabout, bolt holes extending through said block of rubber, spacer bushings in said bolt holes, and bolts extending through said spacer bushings and securing said block of rubber and parts carried thereby to a support.

2. In a device of the character indicated, a pair of strap members each arcuately formed and facing each other to form a substantially circular housing member, means for adjustably connecting the tops of said straps, means for rigidly connecting the bottoms of said straps, a block of sound deadening material integrally formed about the bottoms of said straps and connecting means, an anti-friction bearing carried by said housing, sealing means carried by said housing and sealing the space between said bearing rings, said adjustable clamping means serving to adjustably clamp said anti-friction bearing and seal means in said housing.

HOWELL POTTER.